United States Patent [19]

Pearson

[11] 4,335,393
[45] Jun. 15, 1982

[54] METHOD AND SYSTEM USING SEQUENTIALLY ENCODED COLOR AND LUMINANCE PROCESSING OF VIDEO TYPE SIGNALS TO IMPROVE PICTURE QUALITY

[75] Inventor: Gilbert J. Pearson, Sunnyvale, Calif.

[73] Assignee: Harris Video Systems, Inc., Sunnyvale, Calif.

[21] Appl. No.: 140,550

[22] Filed: Apr. 15, 1980

[51] Int. Cl.³ .................... H04N 5/76; H04N 9/42; H04N 9/32; H04N 9/535

[52] U.S. Cl. .................................. 358/4; 358/11; 358/12; 358/27

[58] Field of Search ............... 358/4, 9, 12, 14, 11, 358/6, 7, 8, 15, 21 R, 27, 127, 133, 134, 138, 141, 142, 145, 147; 360/8, 9, 32, 33, 37

[56] References Cited

U.S. PATENT DOCUMENTS

| | | | |
|---|---|---|---|
| 3,372,228 | 3/1968 | Law | 358/4 |
| 3,463,876 | 8/1969 | Law | 358/138 |
| 3,571,494 | 3/1971 | Law | 358/4 |
| 3,781,463 | 12/1973 | Van Den Bussche | 358/4 |
| 3,950,607 | 4/1976 | Southworth et al. | 358/134 |
| 3,986,202 | 10/1976 | Granger | 358/4 |
| 4,015,286 | 3/1977 | Russell | 358/4 X |
| 4,068,258 | 1/1978 | Bred-Charreton et al. | 358/4 |
| 4,084,181 | 4/1978 | Mita et al. | 358/12 |
| 4,104,683 | 8/1978 | Granger | 360/9 |
| 4,109,276 | 8/1978 | Hopkins, Jr. et al. | 358/4 |
| 4,133,009 | 1/1979 | Kittler et al. | 360/9 |
| 4,163,249 | 7/1979 | Michael et al. | 358/21 R |
| 4,204,227 | 5/1980 | Gurley | 358/138 |
| 4,210,927 | 7/1980 | Yumde et al. | 358/12 |

Primary Examiner—Aristotelis M. Psitos
Attorney, Agent, or Firm—Townsend and Townsend

[57] ABSTRACT

Conventional composite color video signals are re-formatted into a compressed serial format on a line-by-line basis, by sampling the luminance and chrominance components at a predetermined sampling rate and serially arranging the sampled components on a line-by-line basis to form compressed re-formatted video lines, each containing a pair of serially arranged groups of samples, one of the pair of groups containing luminance samples, the other of the pair of groups containing chrominance samples, the groups being compressed in accordance with a predetermined ratio. The separated luminance and chrominance components of the original video signals are sampled at first and second frequencies f1 and f2, which are related by the expression f2=f1/N where N is the predetermined ratio. The luminance and chrominance samples are stored in a storage device at the first and second clock frequencies, respectively, and are serially arranged by reading the samples from the storage device with a third clock signal f3 having a higher frequency than the other two signal frequencies, one of the two groups of samples being read out in its entirety, followed by a reading out of the other group of samples in its entirety. The luminance signal is compressed by a factor f3/f1, and the chrominance signal is compressed by a factor of N×f3/f1.

To optimize the recovery of the chrominance information during the reconverting phase, a "mezzanine" signal is inserted in each re-formatted video line during the re-formatting phase in the gap between the luminance component and the chrominance component.

75 Claims, 16 Drawing Figures

TABLE I

VARIATION A

| $Y_1$ | R-Y(1) |
|---|---|
| $Y_2$ | B-Y(2) |
| $Y_3$ | R-Y(3) |
| $Y_4$ | B-Y(4) |
| ⋮ | ⋮ |

VARIATION B

| $Y_1$ | R-Y(1) |
|---|---|
| $Y_2$ | B-Y(1) |
| $Y_3$ | R-Y(3) |
| $Y_4$ | B-Y(3) |
| ⋮ | ⋮ |

VARIATION C

| $Y_1$ | R-Y(1) | B-Y(1) |
|---|---|---|
| $Y_2$ | R-Y(2) | B-Y(2) |
| $Y_3$ | R-Y(3) | B-Y(3) |
| $Y_4$ | R-Y(4) | B-Y(4) |
| ⋮ | ⋮ | ⋮ |

METHOD AND SYSTEM USING SEQUENTIALLY ENCODED COLOR AND LUMINANCE PROCESSING OF VIDEO TYPE SIGNALS TO IMPROVE PICTURE QUALITY

This invention relates to the field of composite video signal processing and specifically to the processing of color composite video signals for recording and/or transmission and subsequent reproduction.

In broadcast quality video systems, stringent requirements are imposed by the regulating authority (e.g. the FCC in the United States) with respect to the frequency content, signal to noise ratio and other signal parameters. Since much of present day television programming involves the use of recorded program materials, these stringent requirements must be met not only by the studio broadcast equipment but also the studio recording equipment. As a result, extremely high quality recording and broadcasting equipment has been designed and produced, which equipment is extremely expensive due to the precision nature of the products. In the area of recording equipment, for example, quadruplex recorders of sufficiently high quality to function in a broadcast studio environment (e.g. wide bandwidth, high writing speed, high signal to noise radio and high linearity) are extremely expensive and the extent to which such recorders have been deployed in the broadcast industry has largely been limited by their high cost.

Relatively inexpensive video recorders have been developed; however due to severe limitations in signal processing capability, such recorders are not suited for direct broadcast applications and can only be used for either non-broadcast programming (such as in-house closed circuit television installations) or in combination with other signal processing equipment, such as digital video timebase correctors and quadruplex recorders, for broadcast applications.

The primary limitations on the use of low cost video recorders, particularly video tape recorders, arise from the limited bandwidth and relatively low signal to noise ratio. A full broadcast quality video tape recorder typically has an RF bandwidth of approximately 14 MHz, which is sufficient to permit the recording of full bandwidth composite color video signals on a single frequency modulated carrier. As the lower cost recorders have a significantly lower bandwidth (approx. 6 MHz), this approach cannot be used. Consequently, the method adopted in such recorders is to first separate the luminance and color difference signals by filtering, and record the separated signals on tape by different methods. The luminance signal is bandlimited to approximately 2.5 to 3.0 MHz and frequency modulated on a carrier with a center frequency of about 4.5 MHz. The majority of the frequency components of this signal falls between 2 and 6 MHz. The chrominance signal is separated from the composite video signal by band pass filtering which limits the bandwidth of the color difference signals to about 500 KHz. All chrominance is then transferred onto a new amplitude modulated color subcarrier at 688 KHz. This signal containing chrominance is then added to the frequency modulated luminance signal and the combined signals are recorded on tape.

It should be noted that, when modulating the luminance information, 2.0 MHz of bandwidth is left to accommodate the chrominance information. If the recorder is used to record a monochrome signal only, this allowance need not be made and the available luminance bandwidth can be increased by approximately 30%.

Apart from reduced resolution, the above described recording method employed with low cost recorders is subject to a number of sources of picture degradation. The most serious of these sources are the very poor chrominance signal to noise ratio, gain and delay inequalities between chrominance and luminance, and distortion such as differential phase and gain. Recorders using the above processing method produce recordings most would subjectively describe as good after one generation. However, when such a recording is used in the typical program editing process to produce second and third generation recordings, the image is again degraded by virtue of the signal processing, and this degradation is cumulative. The practical result is that the use of such low cost recorders is typically limited to one or two generations of copying, which severely restricts the usefulness of such devices.

SUMMARY OF THE INVENTION

The invention comprises a video signal processing technique which permits relatively low cost video recorders and similar video processing equipment of ordinarily limited performance to record and/or transmit composite color video signals of quality approaching that provided by high quality video processing equipment, such as quadruplex recorders.

Broadly characterized, the invention enables processing of the luminance and color difference components of a video signal in such a way as to substantially reduce or entirely eliminate all of the above sources of degradation by formatting the video signal in such a way that it may be recorded on an existing low cost video tape recorder (VTR) operating in monochrome mode. Moreover, low cost, commercially available recorders are capable of recording signals formatted in accordance with the invention without modification.

The invention includes two aspects: re-formatting conventional composite color video signals into a different compressed serial format; and reconverting the re-formatted serial compressed signals into conventioal composite color video signals. In the re-formatting aspect, the invention broadly comprises the technique of sampling the luminance and chrominance components of composite color video type signals at a predetermined sampling rate; and serially arranging the sampled components on a line-by line basis to form compressed re-formatted video lines, each containing a pair of serially arranged groups of samples, one of the pair of groups containing luminance samples, the other of the pair of groups containing chrominance samples, the groups being compressed in accordance with a predetermined ratio. The applicant has coined the term "SECAL" to designate such re-formatted video signals, the term signifying sequentially encoded chrominance and luminance. For signal sources which supply the original video signals in standard composite form, the invention includes the steps of separating the original video signals into the luminance component and the chrominance components, and sampling the separated components at first and second frequencies $f1$ and $f2$, respectively. The two sampling frequencies are related by the expression $f2 = f1/N$, where $N$ is the predetermined ratio (preferably an integer). The above two steps may be alternately performed by either first separating the chrominance and luminance components by analogue filtering and then sampling, or by sampling and digitizing the composite video signal and then separating the components by digital filtering. The sampling clock signals are synchronized with a timing reference pulse derived from the original video signals or from associated studio equipment, such as a studio sync generator. The luminance and chrominance samples are typically stored in a storage device at the first and second clock frequencies, respectively, and the thus stored samples are serially arranged by generating a third clock signal f3 having a higher frequency than the first and second clock signal frequencies, and reading out one of the two groups of samples in their entirety with the third clock signal followed by a reading out of the other group of samples in their entirety with the third clock signal for each line. This results in compression of the luminance signal by a factor of f3/f1, and compression of the chrominance signal by a factor of Nxf3/f1. The storage device may comprise either an analog storage device, a digital memory device, or combination of both (e.g., storing one of the groups of samples in an analog storage device and storing the other group of samples in the digital memory device). After the composite video signals have been reformatted, further processing of the signals is typically performed, such as converting the re-formatted video lines to analog form and recording the resulting analog signals on a low cost video recorder for later use (e.g., program editing). Alternatively, the signals may be simply transmitted by a suitable transmission link, such as a microwave link, to a receiving station for reconversion back to standard composite video form and subsequent display.

The invention can be applied to any conventional composite video signal format, such as NTSC, PAL, SECAM and the like. Each line of re-formatted video may contain either one or both chrominance components and the entire luminance component, the luminance and chrominance components being compressed in accordance with the ratio noted above. To provide room for additional samples in each re-formatted video line, the conventional line reference pulse, such as the horizontal sync pulse, can optionally be modified to a narrower width, if desired. While the chrominance component contained in each line of re-formatted video may be referenced to any one of a number of preselected reference level signals, in the preferred embodiment a color reference level signal—termed the "mezzanine" signal—is inserted in the gap between the luminance component and the chrominance component. This mezzanine signal, which preferably has a magnitude comprising the median value between black and peak white, serves as a reference level for both positive and negative excursions of the chrominance component for each given line of re-fomatted video. Thus, variations in the absolute magnitude of the processed signals, which may be introduced by dynamic changes in the signal processing characteristics of individual circuit elements, environmental characteristics such as temperature, humidity and the like, and other factors, are substantially nullified.

In the reconverting aspect of the invention, the re-formatted video line signals, received over a transmission link or reproduced from a recording medium, are sampled at a frequency f3' and converted to successive lines of standard composite video signals by combining samples from the luminance group selected at a rate f1' with samples from the chrominance group selected at a rate $f2'=f1'/N$. The sampling signal f3' is generated in synchronism with the video line reference pulse contained in each line. The individual sampling frequencies f1', f2' and f3' are preferably equal to the sampling frequencies f1, f2 and f3, respectively, although this is not an absolute requirement or limitation of the invention. Generally, all sampling frequencies must be sufficiently high to enable adequate reproduction of the range of frequencies contained in the components sampled. In addition, the sampling ratio N must be preserved between the re-formatting and reconverting frequencies: viz. $f2'=f1'/N$. In addition, the transition region between the luminance group and the chrominance group must be defined. In the preferred embodiment, this is accomplished by generating a timing signal a fixed period of time after the appearance of the video line reference pulse for each line, the timing signal being used to specify the boundary. The sampling and converting performed on the received or reproduced re-formatting signals is accomplished in a manner essentially similar to the re-formatting process; however, additionally, after the signals have been converted back to the standard format, composite sync and burst are typically inserted at the beginning of each line in front of the active video portion.

For a fuller understanding of the nature and advantages of the invention, reference should be had to the ensuing detailed description taken in conjunction with the accompanying drawings.

Table I, Variation A,B,C: Three possible variations of the information available from the system is depicted by these variations.

DESCRIPTION OF THE PREFERRED EMBODIMENTS

Figure 1:
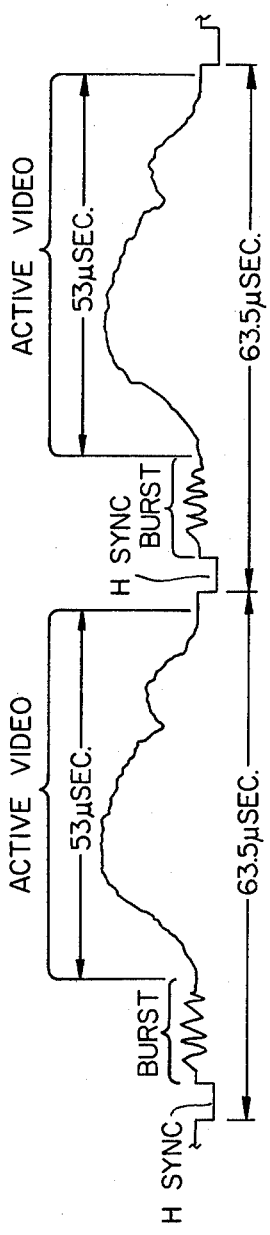
FIG. 1 is a schematic wave form diagram illustrating one line of composite video.

Turning now to the drawings, FIG. 1 illustrates a single line of composite color video encoded in accordance with the NTSC method. As seen in this FIG., the video line comprises a line reference timing pulse (H SYNC), a color reference signal (BURST) and a line of active video in which the luminance and chrominance components are superimposed. Each line has a fixed time duration of 63.5 microseconds within which approximately 53 microseconds contain the active video information, (i.e. superimposed luminance and chrominance), the remaining portion comprising the reference signals.

Figure 2:
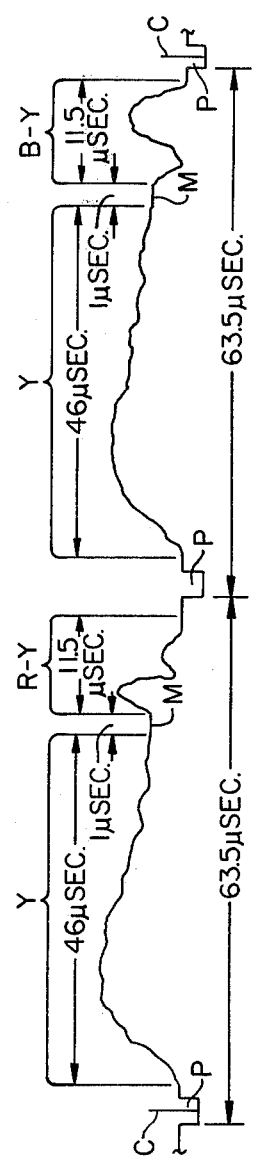
FIG. 2 is a schematic wave form diagram illustrating one line of video re-formatted in accordance with the preferred embodiment of the invention.

FIG. 2 illustrates a single line of video reformatted in accordance with a first embodiment of the invention. As seen in this FIG., the line consists of an initial timing reference pulse P, preferably of shortened duration relative to the duration of the conventional H SYNC pulse, a first portion consisting of luminance information and having a predetermined time duration (46 microseconds), and a second portion consisting of chrominance information and also having a predetermine time duration shorter than that of the luminance portion (11.5 microseconds). Each component in each line contains equivalent information to that found in the standard composite video line but arranged in the separate and serial fashion shown. Inserted between the luminance component (Y) and the chrominance component (R-Y, B-Y) is a mezzanine color reference level signal M of duration sufficiently great to be recognized by the signal processing circuitry described below (e.g. 1 microsecond). This signal M is inserted at a level which is substantially the median level between black and peak white and serves as a dynamic reference for subsequent recognition of the chrominance information present in each line of re-formatted video, the chrominance information exhibiting both positive and negative excursions about the mezzanine level.

It should be noted that, in the preferred embodiment, successive lines of chrominance difference signals are averaged so that only one half of the information is retained. For example, the R-Y information contained in line N of FIG. 2 comprises the average of the R-Y components in real time lines N and N+1. Similarly, the B-Y information contained in line N+1 of FIG. 2 comprises the average of the B-Y components in real time lines N and N+1. While this averaging technique does result in a diminution of vertical chrominance resolution, this loss is negligible.

In order to provide a line marker signal specifying the identity of the color difference signal contained in a given line of re-formatted video, a line identification pulse C is inserted within the boundary of alternate timing reference pulses P. Since this pulse C occurs during horizontal blanking time, no effect is visible when the signals are finally displayed.

It is important to note that the combined duration of the compressed luminance component and compressed chrominance component is longer than the normal active video portion of a standard composite video line. In the FIG. 2 embodiment, for example, the combined length of the luminance and chrominance components is approximately 57.5 microseconds, while in the standard composite video line the length of the corresponding active video portion is 53 microseconds. Thus, a portion of the compressed luminance component in the re-formatted video signal occupies a portion of the conventional horizontal blanking period. In addition, the burst reference has been removed, which is made possible by the fact that the video signal is in component form and not encoded on a subcarrier.

Essential to an understanding of the invention is the manner in which both the luminance and the chrominance components are compressed. As noted above, the luminance and chrominance components are sampled at different frequencies $f_1$, $f_2$ such that $f_2 = f_1/N$, where N is preferably an integer. As is evident from FIG. 2, N=4 (since 46=11.5×4), which provides optimum allocation between luminance and chrominance. At ratios substantially higher, e.g. seven to one, the signals become degraded, with the color having a tendency (when reconverted and displayed) to smear over the luminance. At ratios substantially lower than four to one, the resolution of the video signal tends to degrade due to the deletion of substantial portions of the luminance information. In addition, the luminance is compressed (relative to the conventional line of video-FIG. 1) by approximately 15% (53 microseconds—46 microseconds/53 microseconds), while the chrominance is compressed by a factor of 4.6 (also relative to a conventional line of video). As will be apparent to those skilled in the art, however, the compression ratio can be varied in order to tailor the re-formatting to particular applications and thus to optimize the signal processing.

Figure 3:
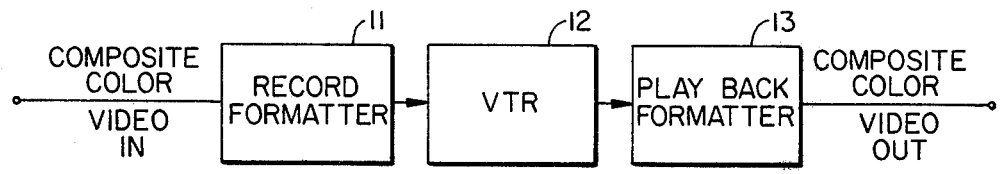
FIG. 3 is a schematic block diagram illustrating the complete video processing system according to the invention.

FIG. 3 illustrates in general block diagram form the system of the invention in a recording/reproducing application, such as may be employed for video editing in a studio. As seen in this FIG., composite color video input signals having the format shown in FIG. 1 are supplied to a record formatter 11 (shown in FIG. 4) in which the signals are re-formatted into signals of the type shown in FIG. 2. After re-formatting, the signals output by unit 11 are recorded on a low cost video tape recorder 12 operated in monochrome mode, for later use. When the recorded signals are required for subsequent use, the signals are reproduced by operating the video tape recorder 12 in playback mode, and are supplied to a playback formatter 13 (shown in FIG. 5) in which the re-formatted signals are converted back to standard composite color video signals.

Figure 4:
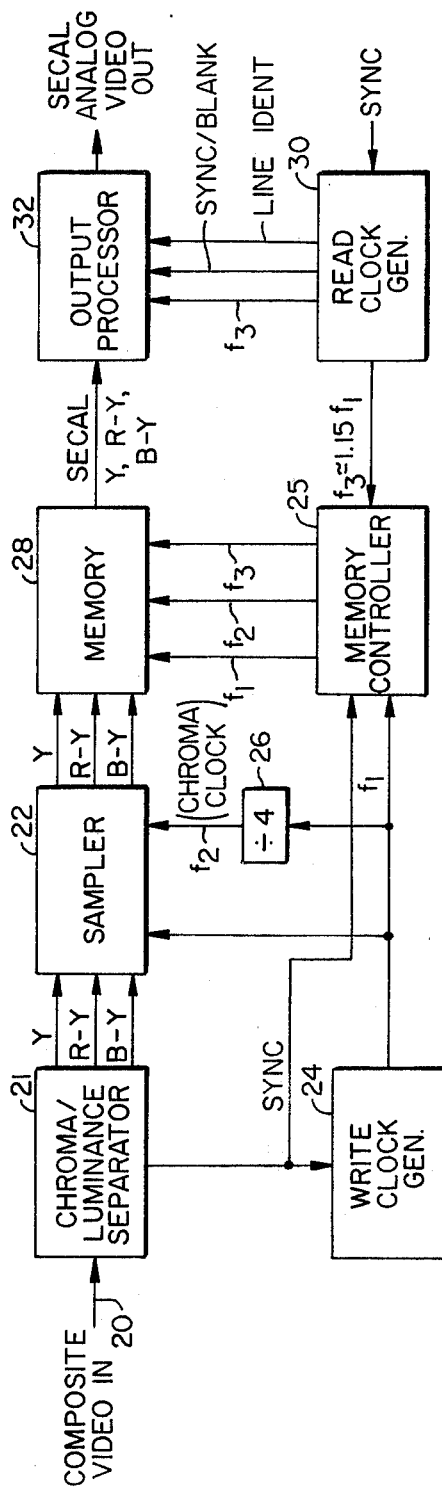
FIG. 4 is a block diagram illustrating the re-formatting portion of the system.

With reference to FIG. 4, the composite video input signals are first supplied to a chroma/luminance separator 21 of conventional construction, in which the individual components of the composite video signals, illustrated as Y, R-Y, and B-Y signals, are separated and presented in parallel form to separate inputs of a sampler 22. The sync signal for each line is also separated in separator 21 and supplied as a timing reference to a write clock generator 24 and a memory controller 25. Write clock generator 24 generates clock signals of a first frequency $f_1$ which are supplied to the clock input of sampler 22 and also to a clock input of memory controller 25. Write clock generator 24 may comprise any one of a number of known devices for generating relatively high frequency clock signals, such as a phase locked loop and a voltage controlled oscillator (VCO) capable of generating relatively high frequency clock signals synchronously related to the sync reference signal supplied from separator 21. Clock signals $f_1$ are also coupled to the input of a divider 26 which generates a related clock signal $f_2$ which is coupled to a separate clock input of sampler 22. The $f_1$ clock signals are used to sample the luminance components Y applied to one of the sampler 22 data inputs, while the related clock signal $f_2$ is used to sample the chrominance components R-Y, B-Y, applied to the remaining inputs of the sampler 22. As noted above, the preferred compression ratio, which is in part determined by the sampling ratios, is four to one: accordingly, divider 26 provides clock signals $f_2$ having a frequency which is twenty-five percent (25%) of the clock signal $f_1$ (i.e. $f_2 = f_1/N$, where N=4). If other ratios are employed, of course, a divider unit 26 providing a different devisor can be employed.

The sampled luminance and chrominance components are coupled to respective data inputs of a memory unit 28 and are clocked into different locations in memory unit 28 under control of write clock signals f1 and f2, which are the clock signals described above. The stored samples are clocked out of memory unit 28 under control of a different clock f3 generated by a read clock generator 30 and having a higher frequency than that of clock signal f1. In the preferred embodiment, the frequency of clock signal f3 is approximately 1.15 times the frequency of write clock signal f1; other multipliers, of course, may be selected, depending on the particular compression ratio employed and the type of input composite signals being processed (e.g. whether NTSC, PAL, etc). The read clock signal f3 supplied by generator 30 is synchronously related to reference sync H signal supplied from the incoming video signals. Read clock generator 30 also generates a sync signal for insertion into the beginning of each line of re-formatted video, which preferably comprises the line reference timing pulse illustrated in FIG. 2 of reduced width, typically 3.5 microseconds or less in the NTSC system illustrated. Further, read clock generator 30 also generates the alternate line identification pulses C used to specify the nature of the chrominance component in a given line. In addition, the read clock generator 30 generates blanking signals for the non-video portion of each line, such as the brief period between the back porch of the line reference pulse in FIG. 2 and the beginning of the luminance component and the brief portion extending between the termination of the chrominance component and the beginning of the next line reference pulse.

Memory unit 28 may comprise any number of known analog or digital devices, or a combination of both, capable of storing the requisite number of component samples required to re-format the video information in serial form. Examples of such devices are random access memory units (RAM), charge coupled storage devices (CCD's), and the like. In addition, memory unit 28 in combination with memory controller unit 25 include the requisite control logic for first sequentially accessing the contiguous samples in the luminance group in succession, followed by sequentially accessing the contiguous samples in the chrominance group in succession.

The serially re-formatted output signals output from memory unit 28 are coupled to the input of an output processor 32 in which the sync, blanking, line identification and mezzanine level information is inserted into each line of serial video.

Output processor 32 also includes additional processing circuitry for converting the serial sampled signals input thereto into analog form. The configuration of the circuitry is dependent upon the nature of the memory unit 28. For example, for a memory unit 28 which comprises a digital storage device, such as RAM, the output processor 32 further includes a digital to analog converter (DAC) clocked in synchronism with read clock f3 to convert multibit digital sample characters into analog form. For a memory unit 28 which comprises an analog memory device, such as a CCD, the output processor 32 also includes an analog filter to remove undesired transients and any other objectionable noise signals. The now re-formatted serial video signals appearing on output terminal 33 of output processor 32 are ready for follow-on processing, such as recording with video tape recorder 12 (FIG. 3).

Figure 5:
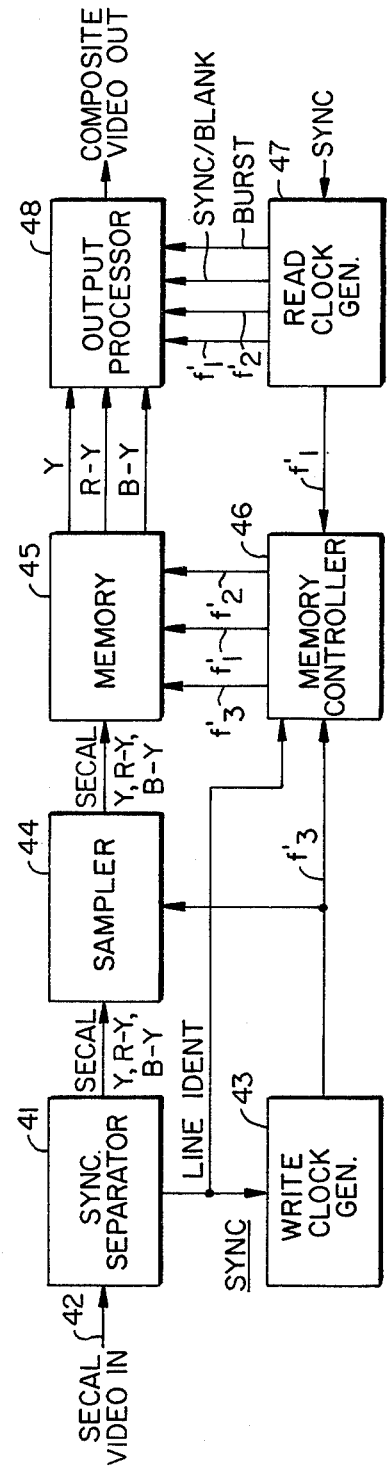
FIG. 5 is a block diagram illustrating the converting portion of the system.

The playback formatter system 13 illustrated in FIG. 5 is analogous in structure and function to the record formatter system 11 in FIG. 4 and includes a sync separator 41 having an input terminal 42 for receiving serial analog signals from video tape recorder 12 or some other source of reformatted video signals. Sync separator 41 separates the luminance and chrominance components from the line reference timing pulse and the line identification pulse. The line reference timing pulse is supplied to a control input of a write clock generator 43 which is similar to write clock generator 24, with the exception that the frequency of the clock signal generated by generator 43 is f3. The line identification pulse is supplied to a memory controller unit 46. The serial analog luminance and chrominance signals are coupled to the input of a sampler 44 in which the analog signals are sampled with the write clock f3, and the samples are furnished to the input of a memory unit 45. The serial samples are clocked into memory unit 45 at the write clock frequency f3 under control of unit 46. The stored line samples in memory 45 are rearranged into parallel output luminance and chrominance components by means of read clock signals f'1, f'2 furnished to memory controller unit 46 by a read clock generator 47. A reference sync signal is supplied to a control input of read clock generator 47 from the incoming video. Read clock generator 47 also contains a sync generator for generating conventional horizontal sync and blanking signals, which are coupled to one reference input of an output processor 48, and reference sub-carrier signals s/c (BURST), which are coupled to a second reference input to output processor 48. The parallel appearing luminance and chrominance samples supplied to the data inputs of output processor 48 are combined with the sync, blanking and subcarrier signals and furnished to an output terminal 50 as composite video signals. Output processor unit 48 additionally contains circuitry for processing the raw input components, depending on the nature of memory unit 45, in a manner similar to that noted above for output processor 32. Specifically, if the raw video components Y, R-Y, B-Y are in multibit digital form, output processor 48 includes a digital to analog converter clocked by the f'1 and f'2 clock signals; if the raw video signals are analog samples, output processor 48 includes a suitable analog filter.

The specific identity of the chrominance components written into memory 28, as well as the order of reading of such components from memory 28 during re-formatting, is dependent primarily upon the original format of the composite video signals supplied to input terminal 20 of separator 21. For example, in the signals illustrated in FIGS. 1, 2, 4 and 5, the original video format may comprise one color difference component in each line of active video, with alternate lines containing alternate components. Further, the alternate chrominance components in any given line may refer to the actual information in that line or the actual information in an adjacent line. For example, with reference to table I, three possible variations are illustrated. In variation A, the original composite video signals include the R-Y chrominance component in odd-numbered lines and the B-Y chrominance component in even-numbered lines. Thus, the components of the first line comprise the luminance portion Y1 and the R-Y chrominance quadrature component for the information in line 1; line 2 contains the luminance component Y2, and the B-Y chrominance quadrature component for line 2; line 3 contains the luminance component Y3 and the R-Y chrominance quadrature component for line 3, etc.

In variation B, line 1 contains the luminance component Y1, and the chrominance quadrature component R-Y for line 1; line 2 contains the luminance component Y2 and the chrominance quadrature component B-Y for line 1; line 3 contains the luminance component Y3 and the chrominance quadrature component R-Y for line 3, etc. Depending upon the nature of the original input video signals, then, and also depending upon the type of processing desired, the signal components supplied to memory 28 may take the form of either variation A or variation B. Depending upon which variation is employed, the memory unit 28 must reassemble the separated components into the desired serial form.

Similarly, it is also contemplated that the variation C format in which each line contains both chrominance components along with the corresponding luminance component may be employed. In this embodiment, either the amount of luminance compression must be increased in order to accommodate a larger total number of chrominance samples, or the number of chrominance samples for each quadrature component must be reduced.

It is further understood that other quadrature components may be substituted for the R-Y and B-Y components, such as the I and Q components.

Figure 6:
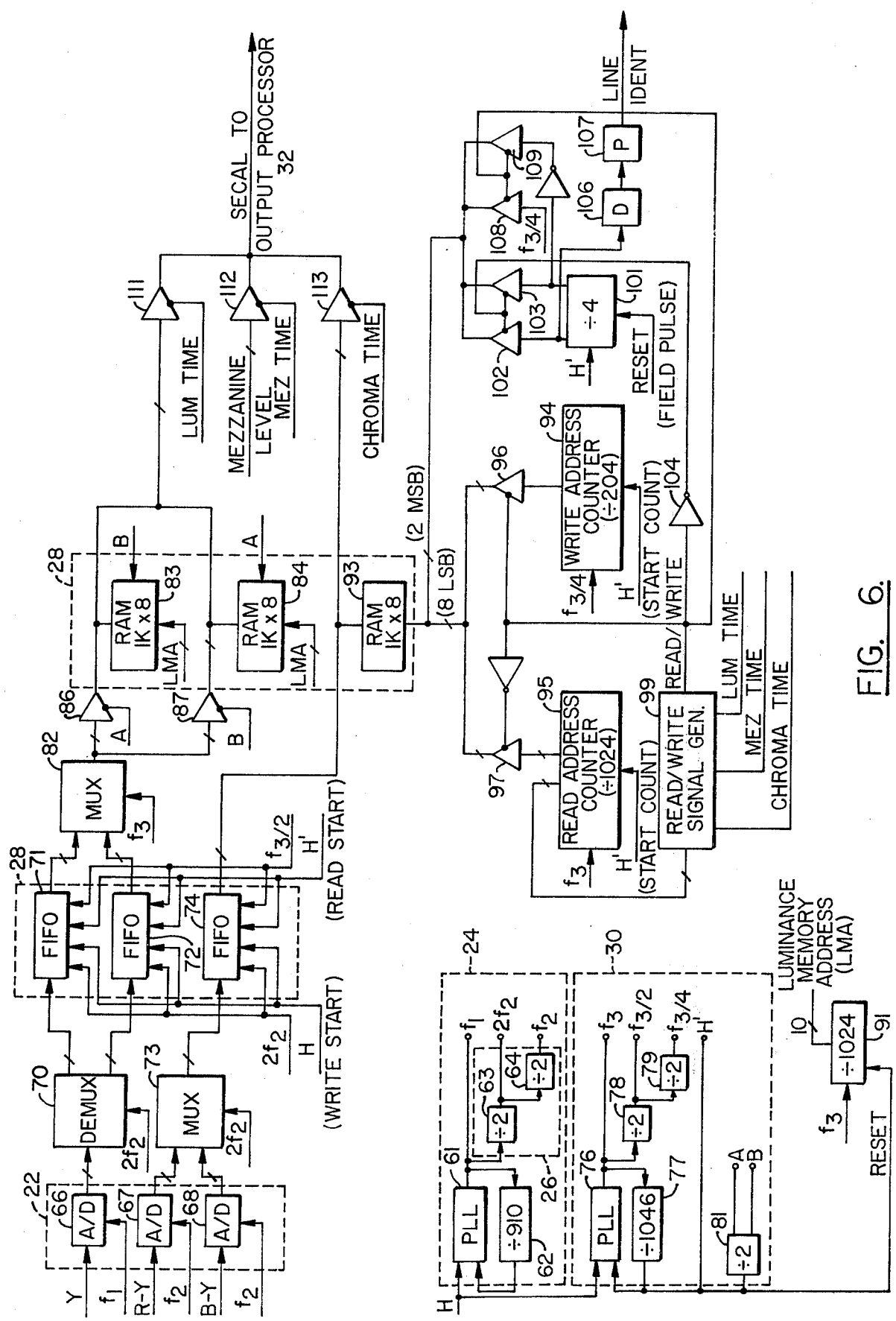
FIG. 6 is a detailed diagram illustrating an embodiment of the FIG. 4 re-formatted portion of the system.

FIG. 6 illustrates a specific embodiment of the subunits of the system reformatting portion of FIG. 4 corresponding to the sampler 22, write clock generator 24, memory controller 25, divider 26, memory 28, and read clock generator 30. In FIG. 6, those elements comprising the various subunits are enclosed within broken line boundaries denoted by the same reference numeral, with the exception of the memory controller units which are distributed throughout the figure. As seen in this Fig., the two write clocks f1, f2 are generated by a phase locked loop 61 having the H sync stripped from the incoming video as a timing reference input. The output of phase locked loop 61 is fed back to the compare input through a divider circuit 62 to enable the write clock signal f1 to track frequency and phase variations in the input H sync timing signal. Write clock f1 is divided down by a pair of divide by two units 63, 64 in order to provide write clock signals having frequencies 2f2 and f2, respectively. The f1 write clock signals are used to acquire the luminance (Y) samples in a first analog to digital converter unit 66; the f2 write clock signals are used to acquire the color difference component samples (R-Y, B-Y) in analog to digital converter units 67, 68. The luminance samples are coupled to a demultiplexer 70 and are alternately stored in a pair of first-in-first-out (FIFO) registers 71, 72 using the 2f2 write clock signal. The color difference component samples are coupled to a multiplexer unit 73 and alternately stored in a FIFO register 74, also under control of the 2f2 write clock signals. The stripped horizontal sync H provides a write start signal for each of FIFO registers 71, 72 and 74.

The read clock signals f3 are generated by means of a separate phase locked loop 76 having the stripped horizontal sync H as a reference timing input signal. The read clock signals f3 are fed back to the compare input of phase locked loop 76 by means of a divider 77. The f3 read clock signals are also coupled to a divide by two circuit 78 in order to provide additional read clock signals 2f2 having a frequency f3 divided by two (f3/2). The output of divide by two circuit 78 is coupled to an additional divide by two circuit 79 in order to provide still additional write clock signals f3/4 (=f1/4). The output of the divider unit 77, termed H', provides the read start signals fo FIFO registers 71, 72 and 74. The H' reference signal is also coupled to the input of a flip-flop 81 in order to provide two internal timing reference signals, termed A and B, for a purpose described below.

The luminance samples flowing through FIFO registers 71, 72 are read out at the 2f2 clock rate to a multiplexer unit 82 in which the successive samples are multiplexed at the f3 read clock rate into two random access memory (RAM) units 83, 84 via tri-state buffers 86, 87. Buffers 86, 87 are enabled on a mutually exclusive basis by means of the internal timing signals A, B, generated by divide by two flip-flop 81. RAM units 83, 84 are addressed by means of a luminance memory address (LMA) generator 91 clocked by the write clock f3 and reset by the H' signal.

The chrominance samples flowing through FIFO register 74 are clocked out at the f3/2 read clock rate into a RAM unit 93. RAM unit 93 is addressed by an addressing unit which includes a write address counter 94 clocked by the f3 divided by four signal from the read clock generator 30 and reset by the H' timing signal, a read address counter 95 clocked at the f3 read clock rate and reset by the H' timing signal. The output lines from counters 94, 95 are each coupled through tri-state buffers 96, 97 which are enabled on a mutually exclusive basis by the timing signal generated by a read/write signal generator 99. Generator 99 preferably comprises a programmable read only memory device for generating a binary read/write signal at the output thereof, the timing signal changing state a predetermined time period after the start of a given line of video. For this purpose, the input to the generator 99 comprises the 8 most significant bits of the read address counter 95, which begins counting from a predetermined state at the beginning of a line of video at the f3 clock rate. Signal generator 99 also provides two additional timing signals termed luminance time (LUM TIME) and mezzanine time (MEZ TIME), both for a purpose to be described below.

The 8 output lines of the address counters 94, 95 form the 8 least significant bits of a 10-bit address used to access chroma RAM unit 93. The two most significant bits are generated during writing of chroma data into RAM unit 93 by means of a divide by four counter 101 which is clocked by H' signal and reset by the field pulse occurring at the beginning of a field of video, and a pair of tri-state buffers 102, 103 coupled to the two-bit output of the divide by four circuit 101. Tri-state buffers 102, 103 are enabled by the read/write timing signal from generator 99 inverted via an inverter 104. It should be noted that the least significant bit output of divide by four network 101 is also used to generate a line identification pulse for insertion into the video in output processor 32. Each line identification pulse is generated by sensing the leading edge of every other H' timing signal, delaying this signal by a predetermined amount in a delay unit 106 and coupling the output of the delay unit into a pulse shaper circuit 107 of conventional design and capable of generating an extremely narrow pulse.

During read time, the two most significant bits of the RAM unit 93 address are generated from the f3 divided by four write clock and from the most significant bit from the divide by four circuit 101, the signals being applied to a pair of tri-state buffers 108, 109. Buffers 108, 109 are controlled by the uninverted read/write timing signal from generator 99.

Figure 7:
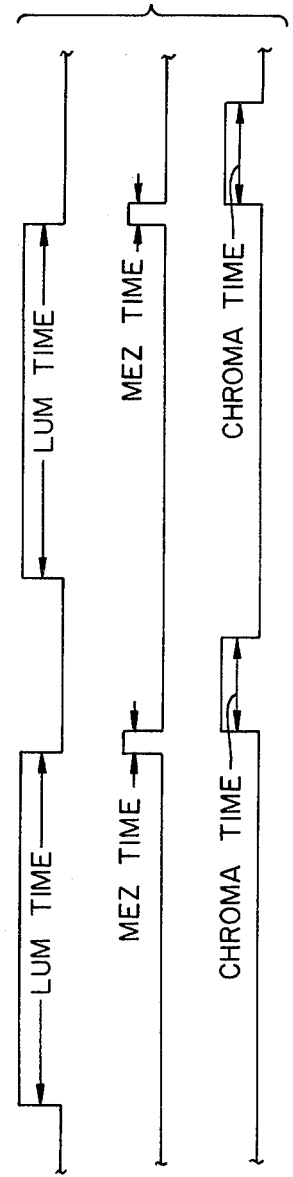
FIG. 7 is a timing diagram showing three line timing signals employed in the FIG. 6 embodiment.

The luminance samples stored in RAM units 83, 84 are alternately read out line by line by means of the luminance memory address signals from counter 91 whenever an enable output signal is applied to the RAM units 83, 84. As is apparent from FIG. 6, RAM unit 83 is enabled to output the samples when RAM unit 84 is disabled and vice versa by means of the A and B signals supplied from flip-flop 81. The luminance samples output from the RAM units 83, 84 are coupled via a tri-state buffer 111 to the output processor 32 during LUM TIME, which occupies 46 microseconds in the embodiment of FIG. 2. After the end of LUM TIME, a mezzanine level signal is inserted in the output data stream by enabling a tri-state buffer 112 and coupling the mezzanine level signal therethrough. The mezzanine level signal may be generated in any conventional way and consists of a digital multi-bit character (in the FIG. 6 embodiment) having a value corresponding to the median level between peak white and black. At the end of mezzanine time, the chroma samples to be inserted in that particular line are read from chroma RAM unit 93 and coupled through a tri-state buffer 113 enabled by the chroma time signal furnished by generator 99. FIG. 7 illustrates the timing relationships among the three enabling signals for buffers 111–113.

Figure 8:
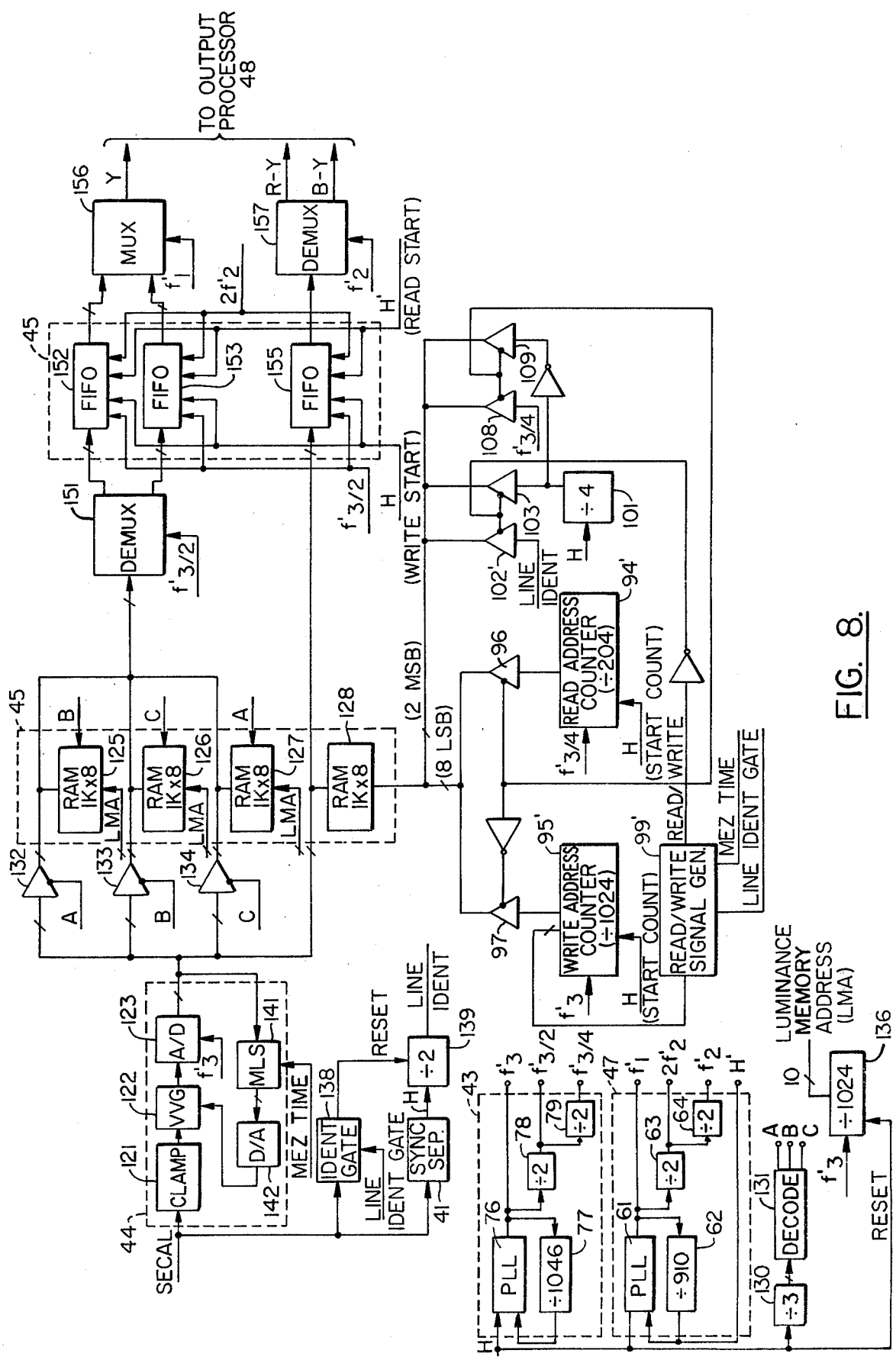
FIG. 8 is a detailed diagram illustrating an embodiment of the FIG. 5 converting portion of the system.

FIG. 8 illustrates an embodiment of the subunits comprising the converting portion shown in FIG. 5, with the exception of sync separator 41 (which is shown in block form only) and output processor 48, since these latter two units are of essentially conventional construction. In FIG. 8 those portions of the write clock generator 43, sampler 44, memory 45, and read clock generator 47 are denoted by broken boundaries bearing the same reference numeral; the memory controller subunit 46 is distributed throughout the figure.

As seen in FIG. 8, incoming SECAL video signals are coupled to a conventional clamp circuit 121 providing a reference DC level, and the signals output from the clamp circuit 121 are coupled to the input of a conventional voltage variable gain unit 122. The signals output from variable gain unit 122 are coupled to the sample input of an analog to digital converter 123 which is clocked by write clock f3′. The digital video signals output from converter 123 are written into different ones of a plurality of RAM units 125, 126, and 127 (luminance RAMs) and RAM unit 128 (chroma RAM). Write access to luminance RAMs 125–127 is controlled by enable signals A, B and C generated from stripped H from the incoming SECAL video by means of a divide by three network 130 and a one out of three decoder 131. As will be apparent, the A, B and C enable signals are mutually exclusive, and are individually applied to a different one of three tri-state buffers 132, 133 and 134. The A-C signals are also applied individually to the output enable terminal of a different one of RAM units 125–127 in order to provide a read enable to these units. RAM units 125–127 are addressed by a luminance memory address counter 136, which is clocked by the f3′ read clock and reset by stripped H timing signal. The write clock generator 43 and read clock generator 47 components are essentially identical to those described above with reference to FIG. 6, with the exception that the relative frequencies are interchanged. In addition, as noted above in the general description of the system, the absolute frequencies of the write clock f3′ and read clocks f1′, f2′ can differ from the corresponding clock frequencies in the reformatter portion of the system.

The chroma RAM 128 is addressed in a manner similar to that described above with reference to FIG. 6, with the exception that the roles of the write address counter and read address counter are interchanged. In addition, during the write operation of the chroma RAM 128, one of the two most significant address bits is derived from a line identification signal applied as the input to tri-state buffer 102′. This line identification signal is generated by enabling a line identification gate 138 during SECAL H time, using the leading edge of SECAL H to toggle a flip-flop 139 and using the line identification pulse (when present) passed through gate 138 to reset the flip-flop 139. The result is a binary signal which persists throughout the length of a line at one of two states, depending on whether the line identification pulse is present or absent. It should further be noted that the divide by four unit 101 of FIG. 8 does not require the field pulse reset input present in the corresponding unit of FIG. 6.

The FIG. 8 subunit also includes a mezzanine level sampler 141 which is enabled to acquire a sample during mezzanine time, specified by the MEZ TIME signal from generator 99. The thus acquired sample of the mezzanine level reference signal is converted from digital to analog form in a digital to analog converter 142, and the analog output signal is coupled to the variable voltage control input terminal of variable gain unit 122.

Luminance samples are read from RAM units 125–127 on a line by line basis, are demultiplexed in a demultiplexer unit 151 at the f3′ divided by two clock rate and alternately stored in FIFO registers 152, 153 under control of the f3′ divided by two write clock signal.

Chroma samples are read from chroma RAM 128 at the f3′ divided by four rate and are stored in a FIFO register 155 at the f3′ divided by two rate.

Figure 9:
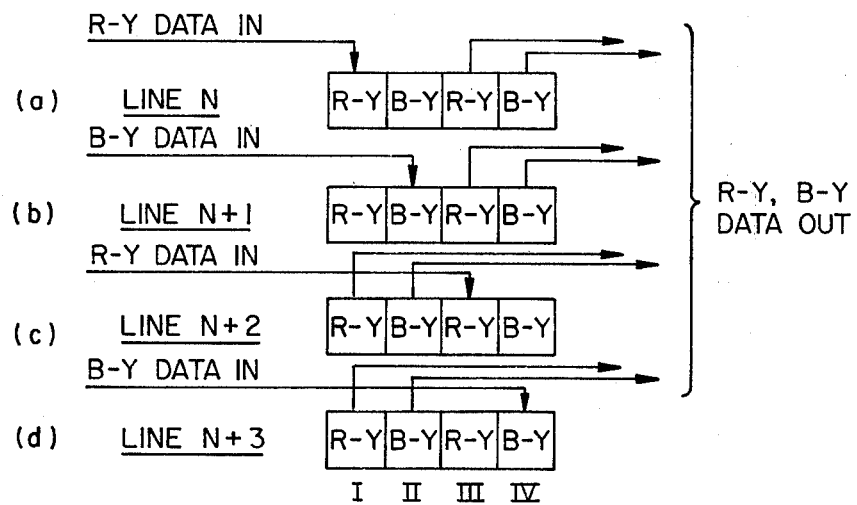
FIG. 9, consisting of a-d, is a schematic diagram illustrating sequential read out of chroma samples for four successive lines.

With reference to FIG. 9, the write/read operation performed with chroma RAM unit 128 over four successive lines is illustrated. Beginning with an arbitrary first line N (illustration a), RAM unit 128 is conceptually divided into four blocks of 256 characters each. Assuming that line N contains R-Y data, these samples are placed in section I of RAM unit 128 during write time. During read time R-Y samples previously stored in section III and B-Y signals previously stored in section IV of RAM unit 128 are alternately read and stored in FIFO 155. These samples are output from FIFO 155 at the 2f2′ rate into a demultiplexer 157. During line N+1 (illustration b) the incoming chroma samples represent the other color difference portion (B-Y), and these samples are stored in section II of RAM unit 128 during write time. During read time, the same samples are read from sections III and IV of RAM unit 128 as in the previous line. During line N+2, the incoming R-Y chroma samples are stored in section III of RAM unit 128 during write time, and R-Y and B-Y samples are alternately read from sections I and II of RAM unit 128. During line N+3, the incoming B-Y chroma samples are written into section IV of RAM unit 128, and the same R-Y and B-Y samples are read from RAM unit 128 during read time for that line.

The luminance samples output from FIFO registers 152, 153 are multiplexed in a multiplexer 156 at the f1′ rate; the chrominance samples clocked out from FIFO register 155 are demultiplexed in demultiplexer unit 157 at the f2′ rate. The now aligned digital luminance samples Y and complementary chroma samples (R-Y, B-Y) are coupled to the output processor unit 48 where they are converted into analog form.

Figure 10:
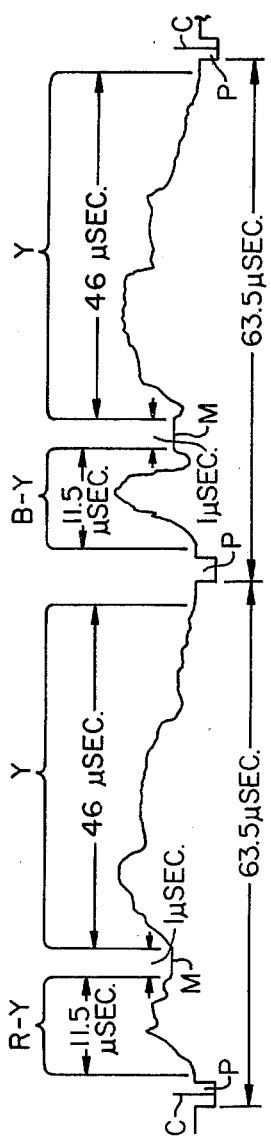
FIG. 10 is a schematic wave form diagram illustrating an alternate embodiment of re-formatting according to the invention.

FIG. 10 illustrates another embodiment of the invention in which the chrominance components, illustrated as the R-Y and B-Y components, appear before the luminance component Y in each reformatted line. This embodiment can be realized by the systems of FIGS. 4 and 5 by rearranging the manner in which the memory unit 28 sample locations are accessed by the read clock signals f3 (FIG. 4) and f'1, f'2 (FIG. 5).

Video signal processing systems employing signals formatted in accordance with the invention enjoy a number of advantages over systems which directly process standard composite video signals. For example, signals formatted in accordance with versions A or B, and having a peak to peak amplitude of 800 millivolts, represent a reduction of approximately thirty-five percent (35%) from the normal peak to peak amplitude of 1.233 millivolts for a standard composite signal. This reduction in amplitude may be traded off with bandwidth requirements so that, for example, a system implementing these two variations could be band limited to about 3.2 mHz to provide a luminance bandwidth of about 3 mHz and a chrominance bandwidth of about 750 kHz. Since the bandwidth of a relatively low cost recorder, such as a Sony U-matic recorder is about 3.5 mHz, such a recorder may be employed to achieve a video program editing system, such as those used for electronic news gathering, having a CCIR impairment figure of about 3.5 after three generations of tape copies. Thus, a relatively low cost recorder, in combination with the relatively low cost electronic elements required to perform the re-formatting signal processing, may be combined to provide a extremely useful editing system. Further, as will appear to those skilled in the art, the commonality of a large proportion of the record formatter 11 subunits and the playback formatter 13 subunits lends itself to a system arrangement in which such common elements may be shared and the total number of circuit components reduced accordingly. Moreover, the picture quality factors normally associated with image degradation, such as velocity errors, differential gain, differential phase and chrominance-luminance gain and delay inequalities, normally found in systems for recording conventional composite video color signals, are entirely absent from systems employing the invention. In addition, the serial arrangement of the luminance and chrominance components eliminates interaction therebetween found in standard composite video signals, thereby eliminating the image degradation caused by such interaction.

While the above provides a full and complete disclosure of the invention, various modifications, alternate embodiments and equivalents may be employed without departing from the spirit of the invention. For example, while the invention has been described with reference to video tape recorders, other types of recording devices may be employed such as video discs or the like. In addition, the invention may be employed in systems other than those requiring a recording device, such as systems for transmitting the video signals over a direct link from a sending station to a receiving station, e.g. a microwave link between a remote color video camera and a central broadcast studio. Moreover, although the read clock units 30, 47 shown in FIGS. 6 and 8 are shown as referenced to incoming H sync, in some applications these units may be referenced to a studio sync generator or other master sync and timing equipment in a given system. Therefore, the above description and illustrations should not be construed as limiting the scope of the invention, which is defined by the appended claims.

What is claimed is:

1. A method of re-formatting video type line sequential signals having luminance and chrominance components, each line of said line sequential signals having a predetermined overall temporal length and an active signals portion of predetermined temporal length less than the overall length, said method comprising the steps of:
    (a) generating first and second sampling clock signals having frequencies f and f/N, respectively, where N is a finite non-zero value;
    (b) sampling said luminance and said chrominance components with said first and second clock signals, respectively;
    (c) temporarily storing the component samples in a storage device;
    (d) generating a third clock signal having a frequency higher than said first clock signal frequency; and
    (e) serially arranging the temporarily stored component samples on a line-by-line basis to form compressed re-formatted video lines each containing a pair of groups of samples, one of said pair of groups containing luminance samples, the other of said pair of groups containing chrominance samples, said groups being compressed in accordance with a predetermined ratio equal to said value N,
    said step of serially arranging including the step of first outputting one of said pair of groups of samples under control of said third clock signal and then outputting the other one of said pair of groups of samples under control of said third clock signal, the relative number of luminance samples and chrominance samples and the frequency of said third clock signal being selected so that the temporal length of that portion of each compressed re-formatted video line containing said groups is less than said overall temporal length and greater than said active signal portion temporal length.

2. The method of claim 1 wherein said video type signals are encoded color video signals, and where said step (b) of sampling is preceded by the step of separating said chrominance components from said luminance components.

3. The method of claim 1 wherein N is an integer.

4. The method of claim 1 wherein said step of generating further includes the step of synchronizing said clock signals with a video line reference pulse.

5. The method of claim 4 wherein said line reference pulse comprises the horizontal sync pulse.

6. The method of claim 1 wherein the samples in one of said groups are digital and wherein said step of temporarily storing includes the steps of storing said one of said pair of groups of samples in an analog storage device and storing the other one of said pair of groups of samples in a digital memory.

7. The method of claim 1 wherein said step of temporarily storing includes the step of storing said pair of groups in an analog storage device.

8. The method of claim 1 wherein said samples are digital and wherein said step of temporarily storing includes the step of storing said pair of groups in a digital memory.

9. The method of claim 1 wherein said samples are digital and wherein said step of outputting is followed by the step of converting each re-formatted video line to analog form.

10. The method of claim 9 wherein said step of converting is followed by the step of recording the analog video lines on a recording medium.

11. The method of claim 9 wherein said step of converting is followed by the step of transmitting the analog video lines to a receiving station.

12. The method of claim 9 wherein said video type signals include an original video line reference pulse, and further including the steps of generating a modified video line reference pulse of reduced width from said original line reference pulse, and inserting said modified video line reference pulse at the beginning of each of said re-formatted video lines.

13. The method of claim 12 wherein said original line reference pulse comprises a horizontal sync pulse of conventional time duration.

14. The method of claim 1 wherein said video type signals include two color difference components per line, and wherein said step (e) of serially arranging includes the step of including samples in said other pair of groups corresponding to both said color difference components.

15. The method of claim 1 wherein said video type signals include alternate color difference components in alternate video lines, and wherein said step of serially arranging includes the steps of including samples in said other pair of groups corresponding to one of said alternate color difference components for a first set of re-formatted video lines, and including samples in said other pair of groups corresponding to the other one of said alternate color difference components for a second set of re-formatted video lines.

16. The method of claim 1 wherein said step (e) of serially arranging further includes the steps of generating a color reference level mezzanine signal, and inserting said mezzanine signal in said reformatted video lines at a predetermined line location.

17. The method of claim 16 wherein said mezzanine signal is inserted between said pair of groups.

18. The method of claim 1 wherein each of said re-formatted video lines contains a group of luminance samples followed by a group of chrominance samples.

19. The method of claim 1 wherein each of said re-formatted video lines contains a group of chrominance samples followed by a group of luminance samples.

20. A method of converting sequentially encoded color and luminance (SECAL) video type signals to standard composite video signals having a predetermined overall temporal length and an active signal portion of predetermined temporal length less than the overall length, said SECAL video type signals having luminance and chrominance components re-formatted as compressed video lines of reduced bandwidth, each line containing a pair of groups of video signals, one of said pair of groups containing compressed luminance samples, the other of said pair of groups containing compressed chrominance samples, said groups being compressed in accordance with a predetermined compression ratio and the temporal length of that portion of each compressed re-formatted video line containing said groups being less than said overall temporal length and greater than said active signal portion temporal length, said method comprising the steps of:

(a) providing said SECAL video type signals;

(b) generating a first clock signal having a first frequency;

(c) sampling said SECAL video type signals with said first clock signal;

(d) temporarily storing the SECAL samples in a storage device;

(e) generating second and third clock signals having second and third frequencies, the ratio of said second and third frequencies being equal to said predetermined compression ratio and said first frequency being higher than said second frequency;

(f) sequentially reading the SECAL luminance group samples corresponding to a given line from said storage device with said second clock signals while contemporaneously sequentially reading the SECAL chrominance group samples corresponding to the same line from said storage device with said third clock signals; and (g) assembling the contemporaneously read SECAL luminance and chrominance samples into said composite video signals, the relative number of luminance samples and chrominance samples produced by said first clock signal and the frequency of said second and third clock signals being selected so that the temporal length of the portion of each line of composite video signals assembled from said SECAL luminance and chrominance samples is substantially equal to the temporal length of said active portion.

21. The method of claim 20 wherein said step (b) of generating includes the step of synchronizing said first clock signal with a video line reference pulse contained in said compressed video lines.

22. The method of claim 21 wherein said video line reference pulse comprises a modified horizontal sync pulse of reduced width from a standard horizontal sync pulse.

23. The method of claim 20 wherein the samples in one of said groups are digital and wherein said step of temporarily storing includes the steps of storing said one of said pair of groups of samples in a digital storage device and storing the other one of said group of samples in an analog storage device.

24. The method of claim 20 wherein said step of storing includes the step of storing said pair of groups in an analog storage device.

25. The method of claim 20 wherein said samples are digital and wherein said step of storing includes the step of storing said pair of groups in a digital memory.

26. The method of claim 20 wherein said step (g) of assembling includes the steps of generating conventional composite sync blanking and burst signals, and inserting said composite sync, blanking and burst signals at the beginning of each line of composite video.

27. The method of claim 26 further including the step of providing a studio sync generator, and wherein said step of generating is performed in synchronism with said studio sync generator.

28. The method of claim 20 wherein said compressed video lines include a color reference level signal and wherein said step (g) of assembling includes the step of using said color reference level signal to adjust the magnitude of said chrominance samples.

29. The method of claim 28 wherein said color reference level signal is located between said luminance samples and said chrominance samples.

30. The method of claim 20 wherein said compressed signals are recorded on a recording medium, and wherein said step (a) of providing includes the step of reproducing said signals from said recording medium.

31. The method of claim 20 wherein said step (a) of providing includes the step of transmitting said compressed signals from a transmitting station to a receiving station over a communication link having said reduced bandwidth.

32. A system for re-formatting video type line sequential signals having luminance components and chrominance components, each line of said line sequential signals having a predetermined overall temporal length and an active signal portion of predetermined temporal length less than the overall length, said system comprising:
input terminal means for receiving said luminance components and said chrominance components;
means for generating first and second clock signals having frequencies f and f/N, respectively, where N is a finite non-zero value;
means coupled to said input terminal means and said generating means for sampling and storing said luminance components and said chrominance components with said first and second sampling clock signals, respectively;
means for generating a third clock signal having a frequency higher than said first clock signal frequency; and
means coupled to said sampling means and said third clock signal generating means for serially arranging the sampled and stored component samples on a line-by-line basis to form compressed re-formatted video lines each containing a pair of groups of samples, one of said pair of groups containing luminance samples, the other of said pair of groups containing chrominance samples, said groups being compressed in accordance with a predetermined ratio equal to said value N, said arranging means including means for first reading one of said pair of groups of samples from said sampling and storing means with said third clock signals and then reading the other one of said pair of groups of samples from said sampling and storing means with said third clock signals, the relative number of luminance samples and chrominance samples and the frequency of said third clock signals being selected so that the temporal length of each compressed re-formatted video line is less than said overall temporal length and greater than said active signal portion temporal length.

33. The system of claim 32 further including means having an output coupled to said input terminal means for separating said video type signals into said luminance components and said chrominance components.

34. The system of claim 32 wherein N is an integer.

35. The system of claim 32 wherein said sampling and storing means further includes means for synchronizing said clock signals with a video line reference pulse.

36. The system of claim 35 wherein said line reference pulse comprises the horizontal sync pulse.

37. The system of claim 35 wherein said sampling and storing means includes means for forming digital samples of one of said groups, a digital storage device for storing said digital samples and an analog storage device for storing the remaining samples.

38. The system of claim 32 wherein said sampling and storing means comprises an analog storage device.

39. The system of claim 32 wherein said sampling and storing means includes means for forming digital samples, and a digital memory device for storing said digital samples.

40. The system of claim 32 wherein said sampling and storing means includes means for forming digital samples, and further including means having an input coupled to the output of said reading means for converting each re-formatted video line from digital to analog form.

41. The system of claim 40 further including means for recording the analog video lines on a recording medium.

42. The system of claim 40 further including means for transmitting the analog video lines to a receiving station.

43. The system of claim 32 wherein said video type signals include an original video line reference pulse, and further including means for generating a modified video line reference pulse of reduced width from said original line reference pulse, and means for inserting said modified video line reference pulse in each of said re-formatted video lines.

44. The system of claim 43 wherein said original line reference pulse comprises a horizontal sync pulse of conventional time duration.

45. The system of claim 32 wherein said video type signals include two color difference components per line, and wherein said means for serially arranging includes means for including samples in said other pair of groups corresponding to both said color difference components.

46. The system of claim 32 wherein said video type signals include alternate color difference components in alternate video lines and wherein said means for serially arranging includes means for including samples in said other pair of groups corresponding to one of said color difference components for a first set of re-formatted video lines, and means for including samples in said other pair of groups corresponding to the other one of said color difference components for a second set of re-formatted lines.

47. The system of claim 32 wherein said means for serially arranging further includes means for generating a color reference mezzanine signal, and means for inserting said mezzanine signal into said re-formatted video line at a predetermined line location.

48. The system of claim 47 wherein said inserting means includes means for positioning said mezzanine signal between said two groups.

49. The system of claim 32 wherein said means for serially arranging includes means for re-formatting each of said video lines to contain a group of luminance samples followed by a group of chrominance samples.

50. The system of claim 32 wherein said means for serially arranging includes means for re-formatting each of said video lines to contain a group of chrominance samples followed by a group of luminance samples.

51. A system for processing sequentially encoded color and luminance (SECAL) video type signals corresponding to original standard composite video signals having a predetermined overall temporal length and an active signal portion of predetermined temporal length less than the overall length, said SECAL video type signals having luminance and chrominance components re-formatted as compressed video lines of reduced bandwidth, each line containing a pair of contiguous groups of video signals, one of said pair of groups containing compressed luminance samples, the other of said pair of groups containing compressed chrominance samples, said groups being compressed in accordance with a predetermined compression ratio and the temporal length of that portion of each compressed re-formatted video line containing said groups being less than said overall temporal length and greater than said active signal portion temporal length, said system comprising:

input terminal means for receiving said re-formatted video type signals;

means for generating a first clock signal having a first frequency;

means coupled to said input terminal means and said generating means for sampling and storing said re-formatted lines with said first clock signals;

means for generating second and third clock signals having second and third frequencies, the ratio of said second and third frequencies being equal to said predetermined compression ratio and said first frequency being higher than said second frequency; and means for converting the sampled groups to successive lines of standard composite video signals, said converting means including means for sequentially reading the SECAL luminance group samples corresponding to a given line from said sampling and storing means with said second clock signals while contemporaneously sequentially reading the SECAL chrominance group samples corresponding to the same line from said sampling and storing means with said third clock signals; and means for assembling the contemporaneously read SECAL luminance and chrominance samples into said composite video signals, the relative number of luminance samples and chrominance samples produced by said first clock signal and the frequency of said second and third clock signals being selected so that the temporal length of the portion of each line of composite video signals assembled from said SECAL luminance and chrominance samples is substantially equal to the temporal length of said active portion.

52. The system of claim 51 wherein said sampling and storing means includes means for synchronizing said first clock signal with a video line reference pulse contained in said re-formatted line.

53. The system of claim 52 wherein said video line reference pulse comprises a modified horizontal sync pulse of reduced width from a standard horizontal zync pulse.

54. The system of claim 51 wherein said sampling and storing means includes means for forming digital samples of one of said pair of groups, a digital storage device for storing said one of said pair of groups of samples and an analog storage device for storing the other one of said group of samples.

55. The system of claim 51 wherein said storage device comprises an analog storage device.

56. The system of claim 51 wherein said sampling and storing means includes means for forming digital samples, and a digital memory means for storing said digital samples.

57. The system of claim 51 wherein said converting means includes means for generating conventional composite sync, blanking and burst signals, and means for inserting said composite sync, blanking and burst signals at the beginning of each line of composite video.

58. The system of claim 56 wherein said composite sync, blanking and burst signal generating means comprises a studio sync generator means.

59. The system of claim 51 wherein said reformatted composite video lines include a color reference level signal, at a predetermined line location, and wherein said converting means includes means for adjusting the magnitude of said chrominance components in accordance with said color reference level signal.

60. The system of claim 51 wherein said color reference level is positioned between said two groups.

61. The system of claim 51 wherein said re-formatted signals are recorded on a recording medium, and wherein said system further includes means coupled to said input terminal means for reproducing said signals from said recording medium.

62. The system of claim 51 wherein said re-formatted signals are transmitted from a transmitting station and wherein said input terminal means includes means for receiving said transmitted signals.

63. A method for processing video type line sequential signals having luminance components and chrominance components to reduce the bandwidth thereof, each line of said line sequential signals having a predetermined overall temporal length and an active signal portion of predetermined temporal length less than said overall length, said method comprising the steps of:

(a) generating first and second sampling clock signals having frequencies f and f/N, respectively, where N is a finite non-zero value;

(b) sampling said luminance and said chrominance components with said first and second clock signals, respectively;

(c) temporarily storing the component samples in a storage device;

(d) generating a third clock signal having a frequency higher than said first clock signal frequency;

(e) serially arranging the temporarily stored component samples on a line-by-line basis to form compressed re-formatted sequentially encoded color and luminance (SECAL) video lines each containing a pair of groups of samples, one of said pair of groups containing luminance samples, the other of said pair of groups containing chrominance samples, said groups being compressed in accordance with a predetermined ratio equal to said value N, said step of serially arranging including the step of first outputting one of said pair of groups of samples under control of said third clock signal and then outputting the other one of said pair of groups of samples under control of said third clock signal, the relative number of luminance samples and chrominance samples and the frequency of said third clock signal being selected so that the temporal length of that portion of each compressed re-formatted video line containing said groups is less than said overall temporal length and greater than said active signal portion temporal length;

(f) providing said re-formatted SECAL video line signals to a subsequent processing device;

(g) generating a fourth clock signal having a fourth frequency;

(h) sampling said SECAL video type signals with said fourth clock signal;

(i) temporarily storing the SECAL samples in a storage device;

(j) generating fifth and sixth clock signals having fifth and sixth frequencies, the ratio of said fifth and sixth frequencies being equal to N and said fourth frequency being higher than said fifth frequency;

(k) sequentially reading the SECAL luminance group samples corresponding to a given line from said storage device with said fifth clock signals while contemporaneously sequentially reading the SECAL chrominance group samples corresponding to the same line from said storage device with said sixth clock signals; and (l) reassembling the contemporaneously read SECAL luminance and chrominance samples into the original composite video signal format, the relative number of luminance samples and chrominance samples produced by said fourth clock signal and the frequency of said fifth and sixth clock signals being selected so that the temporal length of the portion of each line of composite video signals reassembled from said SECAL luminance and chrominance samples is substantially equal to the temporal length of said active portion of the original composite video signals.

64. The method of claim 63 wherein said step (b) of sampling is preceded by the step of separating said chrominance components from said luminance components.

65. The method of claim 63 wherein said samples are digital, and wherein said step (f) of providing includes the steps of converting each re-formatted video line to analog form, and recording the analog video lines on a recording medium.

66. The method of claim 65 wherein said step (f) of providing further includes the step of reproducing said signals from said recording medium.

67. The method of claim 63 wherein said samples are digital and wherein said step (f) of providing further includes the steps of converting each re-formatted line to analog form, and transmitting the analog video lines to a receiving station.

68. Apparatus for recording video signals comprising:
means for receiving video signals having a line scan format that includes, in serial form, a timing signal, a color reference signal, and a superimposed luminance and chrominance signal, each signal occupying a predetermined portion of each line;
means for modifying said video signals into a line scan format having a time duration that is a function of the duration of each line of said received signals and including in serial form, a timing signal, a separate luminance signal, and a separate chrominance signal, wherein the time duration of each modified line is substantially equal to the time duration of each line of the received signals, the combined time duration of the luminance and chrominance signals of each modified line is greater than the time duration of the superimposed luminance and chrominance signals and less than the time duration of each line of the received signals, and the time duration of the luminance signal of each modified line is less than the time duration of the superimposed luminance and chrominance signals, and means for recording said modified video signals.

69. Apparatus as defined in claim 68 including:
means for reproducing the recorded modified video signals, and
means for modifying the reproduced video signals to have a line scan format corresponding to that of the received video signals.

70. Apparatus as defined in claim 68 wherein the combined time duration of said separate luminance and chrominance signals of each modified line is at least equal to the combined time duration of the portion of the received signal including the color reference signal and the superimposed luminance and chrominance signals.

71. Apparatus as defined in claim 68 wherein said modifying means includes means for establishing the relative time duration of the separate luminance and chrominance signals as a preset ratio.

72. Apparatus as defined in claim 71 wherein said establishing means includes means for maintaining the time duration of the separate luminance signal substantially greater than that of the separate chrominance signal.

73. Apparatus as defined in claim 68 wherein said modifying means includes means for separating the superimposed luminance and chrominance signal into said separate luminance and chrominance signals, means for separating the chrominance signal into a plurality of color information signals, and means for including the plurality of color information signals in said serial format as said separate chrominance signal.

74. Apparatus as defined in claim 73 wherein said including means comprises means for providing all of said plurality of color information signals in each line scan format of each of said modified video signals.

75. Apparatus as defined in claim 68 wherein said modifying means includes means for deparating the superimposed luminance and chrominance signal into said separate luminance and chrominance signals, means for separating said chrominance signal into a plurality of color information signals, and means for including one of said plurality of color information signals in any single line scan.

* * * * *